UNITED STATES PATENT OFFICE

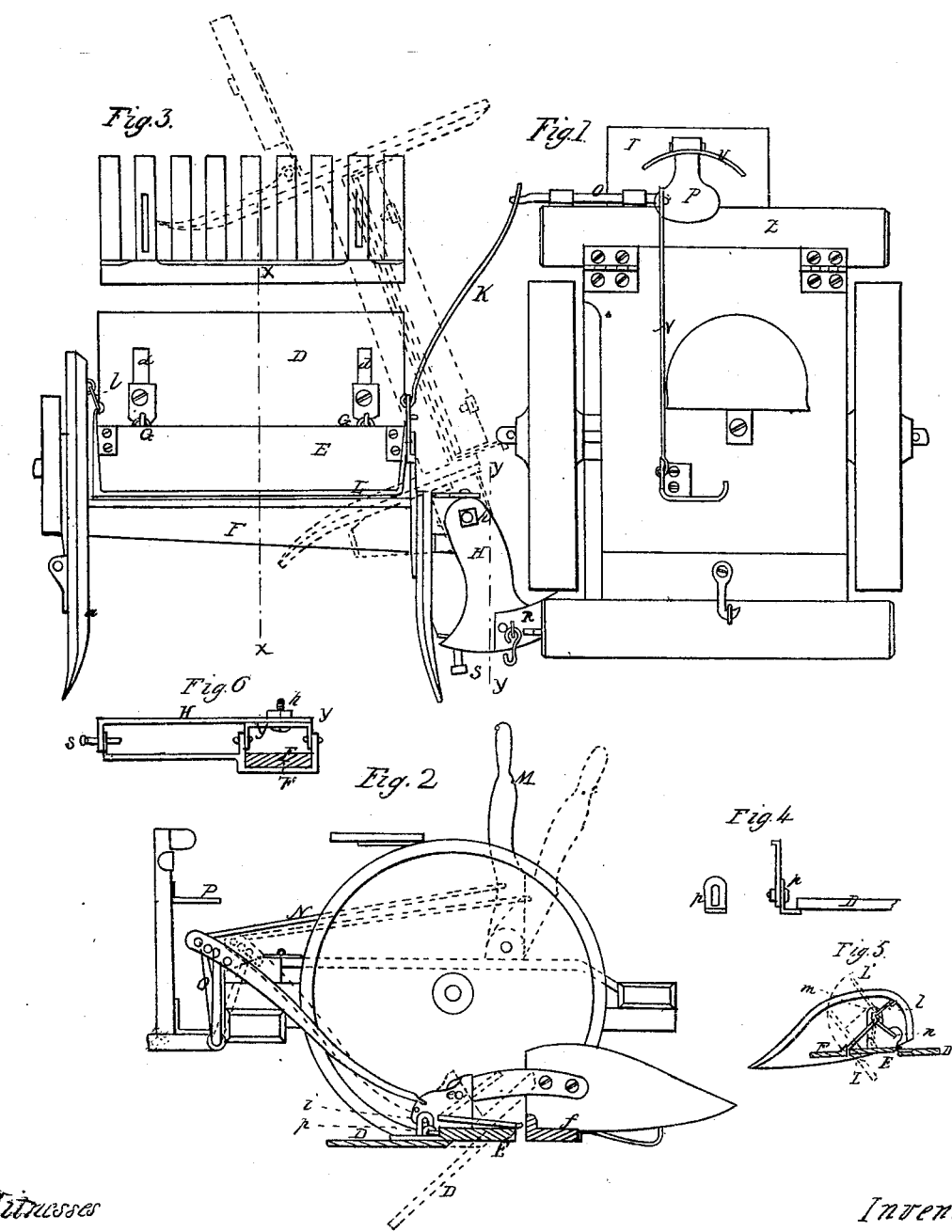

JOHN F. SEIBERLING, OF AKRON, OHIO.

IMPROVEMENT IN HARVESTERS.

Specification forming part of Letters Patent No. 91,172, dated June 8, 1869.

*To all whom it may concern:*

Be it known that I, JOHN F. SEIBERLING, of Akron, in the county of Summit and State of Ohio, have invented a new and useful Improvement in Harvesters; and I do hereby declare that the following is a full and exact description thereof, reference being had to the accompanying drawings, and to the letters of reference marked thereon.

My invention relates to the class of harvesters having dropping platforms, the front end of which rises from the finger-bar in discharging the gavel.

It consists, first, in arranging in or nearly in the same vertical plane the hinges which unite the two sections of the platform, and the hinges or pivots upon which the platform tilts; second, in so pivoting and operating the dropping platform that the forward edge, as it rises from the finger-beam, will move forward, and as it descends will move backward away from the grain; third, the adjustability of the rear section of the platform upon the hinges that unite the two sections, and in other improvements.

In the accompanying drawings, Figure 1 is a top view of my improved harvester. Fig. 2 is a longitudinal section through the finger-beam and a lateral view of other parts. Figs. 3, 4, 5, and 6 are detached views.

My double dropping platform has a wider section and a narrower section, E, connected by hinges G. It is hung or supported on pivots $e$, Figs. 2 and 5, placed upon the dividing-boards a considerable distance above the platform. These pivots are placed in or nearly in the same vertical plane with the hinges G, which connect the two sections of the platform. As the platform thus tilts upon pivots nearer the front edge than the rear edge of the platform the rear end of the platform will drop of its own weight, being heavier than the front end.

By the above arrangement there is less motion of the platform required for the rear end to reach the stubble, also less motion of the treadle, which is consequently more easily worked; also, by having the rear section of the platform wider than the front, the rear section may be raised sufficiently high for long grain without making the platform too short, as will sometimes be the case with a short or narrow rear section. Thus, swinging upon pivots high on the dividing-boards, the front edge of the platform in rising from the finger-beam moves forward, and as it descends it moves backward; and the front edge of the platform rises high enough to form a practical cut-off, while the platform receives sufficient inclination to discharge the gavel.

The above motion of the front edge of the platform not only pushes the grain forward as the platform rises, but the platform moves away from the grain as the front edge descends, thus effectually preventing the grain from getting between the finger-beam and the front edge of the platform.

By means of the slots $d$ and bolts therein the rear section of the platform is made adjustable upon the hinges G, thus rendering the platform capable of being made longer or shorter, at pleasure, without interfering with the flexibility of the hinges G.

By thus shortening the platform a great advantage is gained in cutting short grain where it is necessary to hang the platform near the ground, and where the rear of a long platform would be liable to strike the ground in tilting.

In order to prevent long grain from running over the rear of the platform before tilting, it is often necessary to elevate the rear of the platform. For this purpose I have used an adjustable metallic support, $p$, Fig. 4, with a hook at its lower end, and with a bolt, $i$, in a slot, for adjustment.

In Fig. 3 is represented a slatted rear section which will work for both long and short grain without making the platform extensible, because the slats may be long enough to carry long grain, and yet short grain will be caught by the stubble passing up through the slats when the platform is tilted, and thus drawn off.

A bail-rod or cut-off, L, lies on the edge of section E of the platform next the finger-beam. The extremities are hinged, as at $m$, Fig. 5, a convenient distance above the rear edge of the section.

The hinge on the dividing-board is formed by a hook, $l$, one end of which, attached to the bail-rod, forms the pivot on which the bail-rod turns, while the other end of the hook drops in a small staple in the dividing-board.

The bail-rod is continued from the joint, bent downward, and pivoted to the rear of section E of the platform at *n*. This operates as the shorter end of a bent lever, to raise the front of the bail more rapidly than the edge of the platform, and thus, when the platform is tripped, to separate the gavel from the other grain.

A flange or rib, *f*, is placed at or near the rear upper edge of the finger-beam, for the purpose of preventing the butts of the grain from sliding over the finger-beam when the platform is tilted. This rib may be removable for changing the reaper to a mower.

The platform is operated by means of a lever or treadle, M, in connection with the rods N and K and the double-elbow lever O.

The lever K may be made shorter or longer by means of holes therein, for the purpose of raising or lowering the front of the platform, as required.

Between the piece Y, Fig. 6, and the crooked brace-bar H R there is a horizontal hinge, *h*, for the purpose of folding the finger-beam backward to the side of the traveling wheel, as seen in red lines, Fig. 1. Preparatory to thus folding the finger-beam the rear section of the platform is folded on the hinges G and the pin S removed.

At the rear of the main frame Z the raker's stand T is placed very low, so that the raker can reach the gavel to rake it on one side after it has been dropped by the platform D. This stand may have a seat, P, and a back, U.

Having thus fully described my invention, I desire to secure by patent the following claims:

1. In a tilting double platform the front edge of which rises from the finger-beam, I claim arranging the hinges which unite the two sections of the platform and the hinges or pivots upon which the platform tilts in or nearly in the same vertical plane, substantially in the manner and for the purposes set forth.

2. I claim so pivoting and operating a dropping platform the front edge of which rises from the finger-beam that the forward edge of the same as it rises will move forward in relation to the finger-beam, and as it descends will move backward, substantially as set forth.

3. I claim making the double platform extensible by moving the rear section backward and forward on the hinges that unite the two sections, substantially as described.

4. In combination with the tilting platform, dividing-boards, and cut-off rod or bail, I claim the hook *l*, Fig. 5, forming a hinge, on which the bail is raised from the front of the platform when the latter is tilted, substantially as described.

5. I claim the slotted adjustable support *p*, or the equivalent thereof, for adjusting the rear end of the double platform to the height required, for the purposes set forth.

6. I claim so constructing and arranging a harvester that the rear section of the platform may be folded up and the finger-beam then swung horizontally backward, substantially in the manner and for the purposes set forth.

7. I claim the combination and arrangement of the dropping or tilting platform, main frame, and raker's stand, substantially in the manner and for the purposes specified.

8. I claim the combination of the crooked brace-bar H R, the piece Y, and the shoe, substantially as described.

J. F. SIEBERLING.

Witnesses:
J. N. BUTTES,
WM. M. CUNNINGHAM.